United States Patent
Che et al.

(10) Patent No.: US 12,198,727 B2
(45) Date of Patent: Jan. 14, 2025

(54) VIDEO PROCESSING METHOD FOR APPLICATION AND ELECTRONIC DEVICE

(71) Applicant: BEIJING ZITIAO NETWORK TECHNOLOGY CO., LTD., Beijing (CN)

(72) Inventors: Wanli Che, Beijing (CN); Weishu Mo, Beijing (CN); Cheng Li, Beijing (CN); Xuelun Fu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/406,906

(22) Filed: Aug. 19, 2021

(65) Prior Publication Data

US 2022/0319548 A1    Oct. 6, 2022

(30) Foreign Application Priority Data

Mar. 30, 2021  (CN) .......................... 202110341049.3

(51) Int. Cl.
*G11B 27/02* (2006.01)
*G06F 3/16* (2006.01)
(Continued)

(52) U.S. Cl.
CPC .............. *G11B 27/02* (2013.01); *G06F 3/165* (2013.01); *G10L 21/0232* (2013.01); *H04R 3/00* (2013.01);
(Continued)

(58) Field of Classification Search
CPC ..... G11B 27/02; G06F 3/165; G10L 21/0232; G10L 2021/02082; G10L 2021/02163;
(Continued)

(56) References Cited

U.S. PATENT DOCUMENTS

| 8,983,641 B2* | 3/2015 | Chuang ................... H04R 3/00 700/94 |
| 11,281,423 B1* | 3/2022 | Fieldman ................ G06F 9/451 |

(Continued)

FOREIGN PATENT DOCUMENTS

| CN | 101223767 A | 7/2008 |
| CN | 103208298 A | 7/2013 |

(Continued)

OTHER PUBLICATIONS

Office Action issued May 6, 2022 issued in Chinese Patent Application No. 202110341049.3.

(Continued)

*Primary Examiner* — Helen Shibru

(57) ABSTRACT

The present disclosure relates to a video processing method for an application and an electronic device. The method comprises: receiving a configuration instruction for an audio during an editing process of a video; and configuring the audio during a shooting process of the video in response to the configuration instruction, and displaying a microphone control in a shooting page of the video in a case where a configuration result indicates that the audio is configured during the shooting process of the video; wherein recording of an original sound is configured during the shooting process of the video when the microphone control is in an on state, and not recording of the original sound is configured during the shooting process of the video when the microphone control is in an off state.

15 Claims, 9 Drawing Sheets

(51) Int. Cl.
  *G10L 21/0232* (2013.01)
  *H04R 3/00* (2006.01)
  *G10L 21/0208* (2013.01)
  *G10L 21/0216* (2013.01)
(52) U.S. Cl.
  CPC ............... *G10L 2021/02082* (2013.01); *G10L 2021/02163* (2013.01); *H04R 2430/01* (2013.01)
(58) Field of Classification Search
  CPC ... G10L 21/0208; H04R 3/00; H04R 2430/01; H04N 21/4852; H04N 21/4307
  See application file for complete search history.

(56) References Cited

U.S. PATENT DOCUMENTS

| | | | |
|---|---|---|---|
| 11,463,499 B1 * | 10/2022 | Fieldman | H04L 65/403 |
| 11,941,708 B2 * | 3/2024 | Sun | H04N 1/00413 |
| 2001/0033741 A1 | 10/2001 | Miyashita | |
| 2004/0239790 A1 * | 12/2004 | Maeda | H04N 23/72 |
| | | | 348/241 |
| 2005/0001924 A1 * | 1/2005 | Honda | H04N 23/69 |
| | | | 348/E5.045 |
| 2007/0071254 A1 | 3/2007 | Marton | |
| 2008/0152336 A1 * | 6/2008 | Hara | H04N 23/651 |
| | | | 396/311 |
| 2015/0032766 A1 * | 1/2015 | Greenbaum | G06F 16/444 |
| | | | 707/756 |
| 2019/0373030 A1 * | 12/2019 | Chiu | H04L 65/4053 |
| 2021/0012761 A1 | 1/2021 | Song | |
| 2021/0026886 A1 | 1/2021 | Song | |
| 2021/0195284 A1 | 6/2021 | Song | |
| 2022/0319548 A1 | 10/2022 | Che et al. | |

FOREIGN PATENT DOCUMENTS

| | | | | |
|---|---|---|---|---|
| CN | 107959873 A | | 4/2018 | |
| CN | 108600825 A | | 9/2018 | |
| CN | 108668164 A | | 10/2018 | |
| CN | 108900768 A | | 11/2018 | |
| CN | 108900902 A | | 11/2018 | |
| CN | 109166589 A | | 1/2019 | |
| CN | 109189292 A | | 1/2019 | |
| CN | 110266982 A | | 9/2019 | |
| CN | 110602394 A | | 12/2019 | |
| CN | 111050070 A | | 4/2020 | |
| CN | 112153288 A | | 12/2020 | |
| CN | 113038014 A | * | 6/2021 | ......... H04N 21/4318 |
| CN | 113079419 A | | 7/2021 | |
| JP | 04-074069 A | | 3/1992 | |
| JP | 2001309221 A | | 11/2001 | |
| JP | 2004-221666 A | | 8/2004 | |
| JP | 2006-148183 A | | 6/2006 | |
| JP | 2021530147 A | | 11/2021 | |
| WO | 2020010818 A1 | | 1/2020 | |

OTHER PUBLICATIONS

International Search Report issued Jun. 8, 2022 in International Application No. PCT/CN2022/080816, with English translation (6 pages).
European Search Report for EP Patent Application No. 22778550.8, Issued on Jul. 8, 2024, 9 pages.
Notice of Reasons for Refusal for Japanese Application No. 2023-560029, mailed Oct. 22, 2024, 10 pages.

* cited by examiner

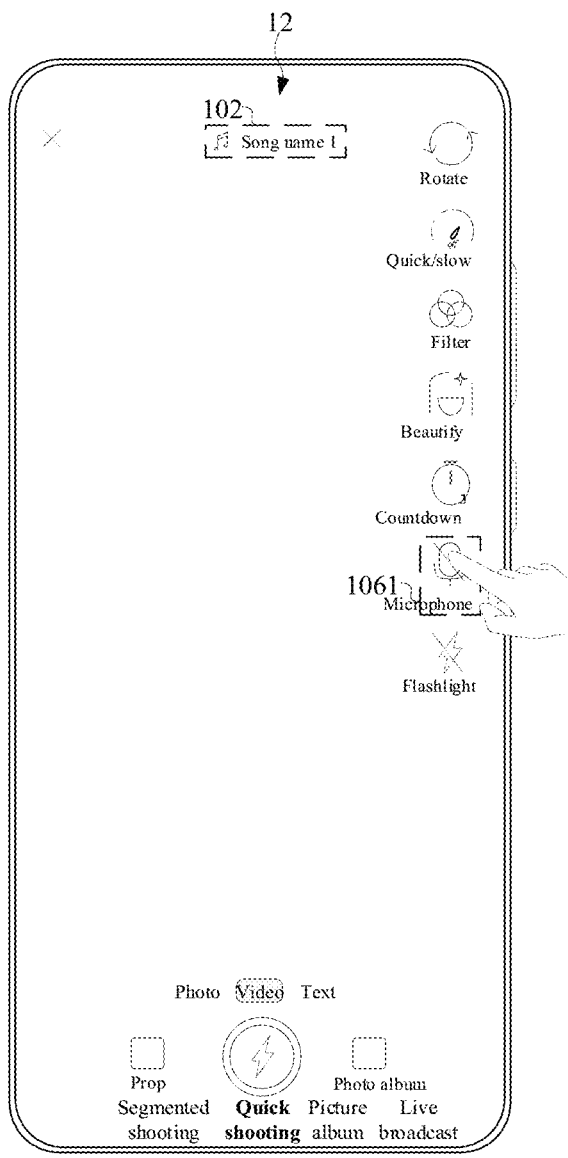
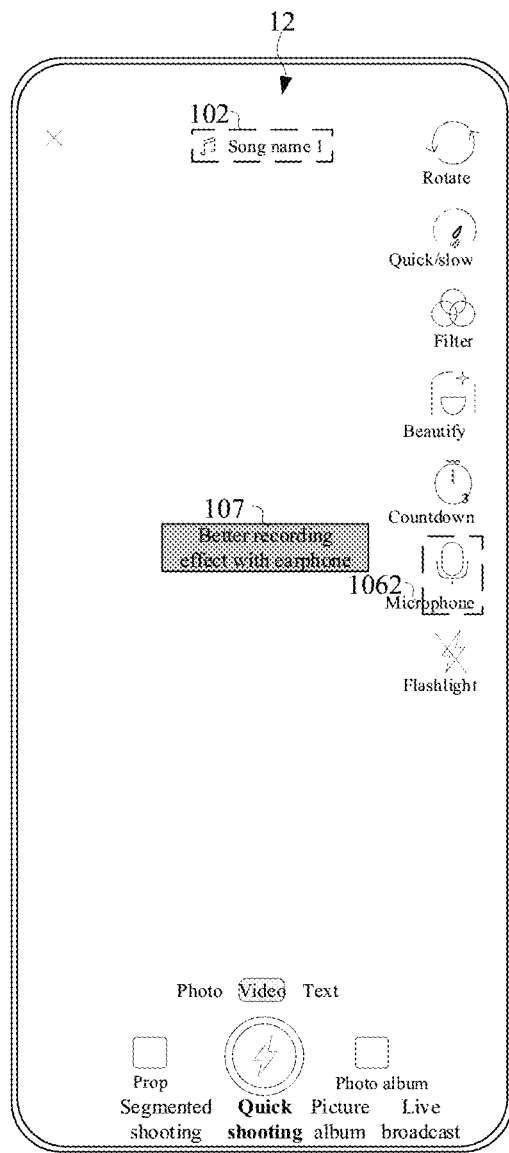
Fig. 1E
Fig. 1F

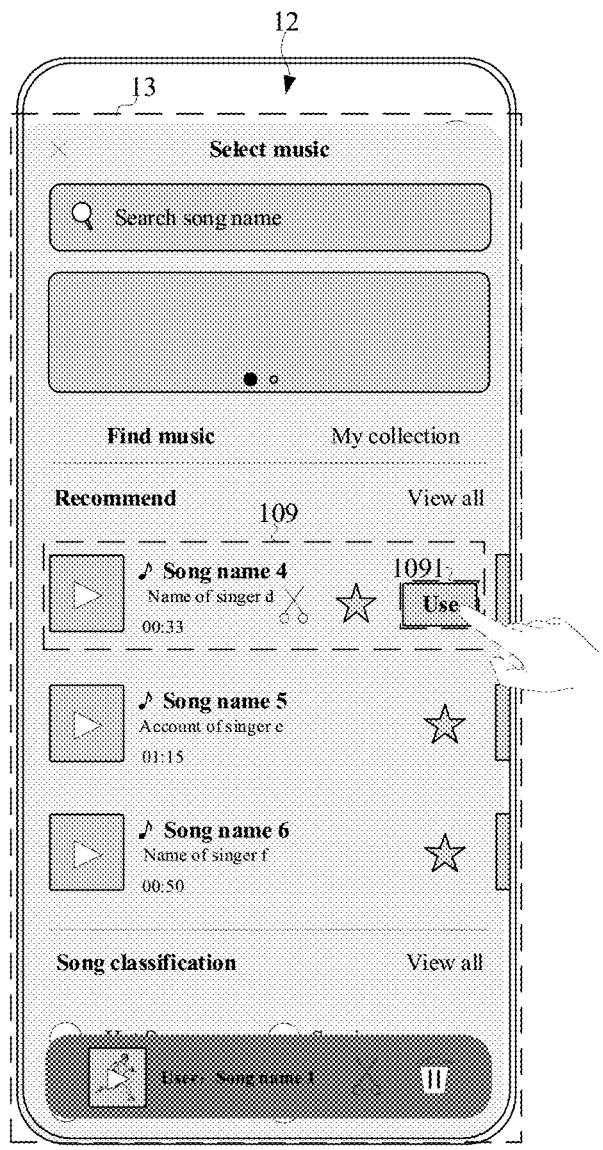
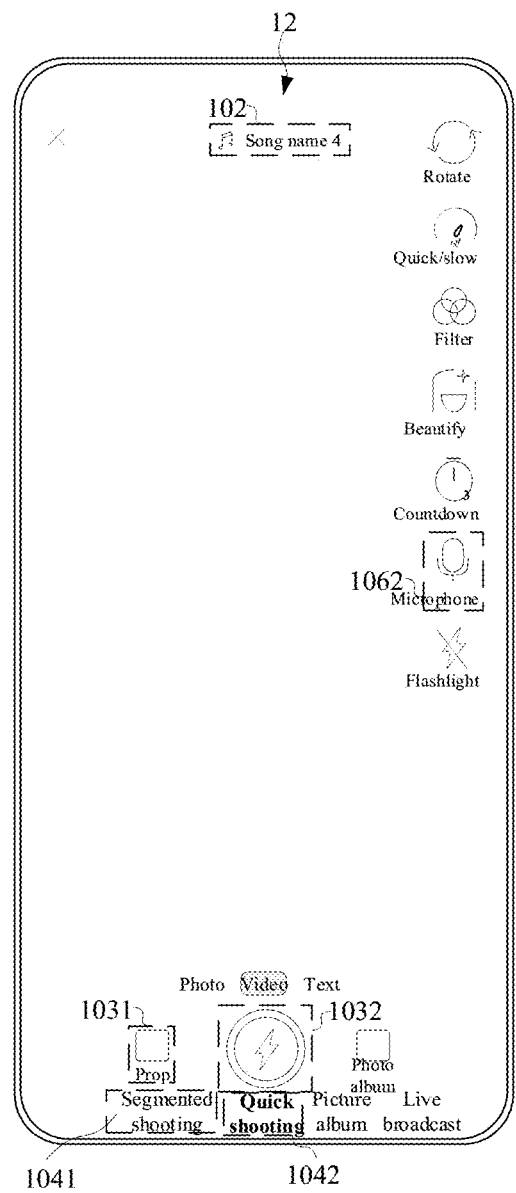
Fig. 1I
Fig. 1J

VIDEO PROCESSING METHOD FOR APPLICATION AND ELECTRONIC DEVICE

CROSS-REFERENCE TO RELATED APPLICATIONS

The present disclosure is based on and claims priority to China Patent Application No. 202110341049.3 filed on Mar. 30, 2021, the disclosure of which is incorporated by reference herein in its entirety.

TECHNICAL FIELD

The present disclosure relates to a video processing method for an application and an electronic device.

BACKGROUND

With the continuous development of internet technology, a user tends to choose an application (APP) for video production. Currently, the user may select an audio to play as background music in a video to be shot by using an existing APP. However, after the audio is selected, in the existing application, it is impossible to turn on a microphone to record an original sound during a shooting process of the video. As a result, in the application, it is impossible to realize a shooting scenario where the background music and the original sound exist in the video at the same time, such as soundtrack singing, rap, recitation, and dubbing commentary, thereby limiting an intension of the user to produce a video and share a video in the application.

SUMMARY

In order to solve the above-described technical problem or at least partially solve the above-described technical problem, the present disclosure provides a video processing method for an application and an electronic device.

In a first aspect, a video processing method for an application is provided in the present disclosure. The method comprises: receiving a configuration instruction for an audio during an editing process of a video; and configuring the audio during a shooting process of the video in response to the configuration instruction, and displaying a microphone control in a shooting page of the video in a case where a configuration result indicates that the audio is configured during the shooting process of the video; wherein recording of an original sound is configured during the shooting process of the video when the microphone control is in an on state, and not recording of the original sound is configured during the shooting process of the video when the microphone control is in an off state.

Through the method provided by the first aspect, the electronic device may receive a configuration instruction for an audio during the editing process of the video. After receiving the configuration instruction, the electronic device may configure the audio during a shooting process of the video, and display a microphone control in a shooting page of the video in the case where a configuration result indicates that the audio is configured during the shooting process of the video. Recording of an original sound is configured during the shooting process of the video when the microphone control is in an on state, and not recording of the original sound is configured during the shooting process of the video when the microphone control is in an off state.

Thus, after the audio selected by the electronic device as the background music in the shooting page of the video in the application is provided to play in the video to be shot, the microphone control is displayed in the shooting page of the video, which is convenient for the user to manually control whether to record an original sound by way of the microphone control. In this way, the application can support the turning on or off of the microphone to record an original sound after the music is selected based on the subjective will of the user, thereby satisfying a shooting expectation and a production appeal of the user in recording an original sound after adding the music, and helping the user to realize a shooting scenario where the background music and the original sound exist in the video at the same time, such as soundtrack singing, rap, recitation, and dubbing commentary by using the application. In this way, it is possible to offer the user adequate production freedom and production convenience, and raise the degree of interest of the user in producing a video in the application, thereby encouraging more users to produce and publish videos in the application.

In some embodiments, the microphone control is not displayed in the shooting page of the video in a case where the configuration result indicates that the audio is not configured during the shooting process of the video. Thus, the microphone control may be displayed after there is an audio configured, and the microphone control may not be displayed after there is no audio configured, thereby realizing the dynamic display of the microphone control.

In some embodiments, in the case where the microphone control is in the on state, the method further comprises: receiving a replacement instruction for the audio; and configuring a replaced audio during the shooting process of the video, and displaying the microphone control in the shooting page of the video in response to the replacement instruction.

In some embodiments, in the case where the microphone control is in the off state, the method further comprises: configuring a dithered display of the microphone control in the shooting page of the video.

In some embodiments, in the case where the microphone control is switched from the off state to the on state, the method further comprises: configuring a first prompt content to be displayed in the shooting page of the video within a first preset time period, wherein the first prompt content is configured to prompt the user that the video shot using an earphone presents a favorable effect.

In some embodiments, in the case where it is detected that the microphone control is turned on, the method further comprises: recording the original sound when the video is shot using the configured audio.

In some embodiments, the method further comprises: using a microphone sound of an electronic device as the original sound by adopting a low delay echo cancelling technology in a case where a user does not use an earphone to shoot the video; and using a microphone sound of the earphone as the original sound in a case where the user uses the earphone to shoots the video.

In some embodiments, after the shooting process of the video is completed, the method further comprises: receiving an adjustment instruction for a volume of the video; and adjusting a volume of the audio and/or a volume of the original sound in the video in response to the adjustment instruction.

In some embodiments, the method further comprises: receiving an editing instruction for the volume of the video; displaying a first control and a second control in a volume editing page of the video in response to the editing instruction, wherein the first control is configured to adjust a volume of the audio, and the second control is configured to adjust a volume of the original sound; and receiving an adjustment instruction for the volume of the video, wherein the receiving of the adjustment instruction for the volume of the video comprises: receiving the adjustment instruction on the first control and/or the adjustment instruction on the second control.

In some embodiments, the method further comprises: receiving an editing instruction for a volume of the video; displaying an adjustment control in a volume editing page of the video in response to the editing instruction, wherein the adjustment control is configured to adjust a volume ratio of the audio and the original sound; and receiving an adjustment instruction for the volume of the video, wherein the receiving of the adjustment instruction comprises: receiving the adjustment instruction on the adjustment control.

In some embodiments, in response to the editing instruction, the method further comprises: displaying the volume of the audio and the volume of the original sound in the volume editing page of the video.

In some embodiments, the method further comprises: receiving a configuration instruction for a prop, wherein the prop is configured to affect a playback effect of the video and does not support recording of the original sound; and configuring the prop during the shooting process of the video and displaying the microphone control that is in the off state and does not support changing of a state in the shooting page of the video in response to the configuration instruction for the prop.

In some embodiments, the method further comprises: displaying a second prompt content in the shooting page of the video during a second preset time period, wherein the second prompt content is configured to prompt the user that the prop does not support recording of an original sound.

In some embodiments, in a case where the video is shot in a segmented shot mode, the method further comprises: receiving an editing instruction on the microphone control after pausing a shoot of a segment of the video; and displaying the microphone control in the on state in the shooting page of the video in response to the editing instruction, or displaying the microphone control in the off state in the shooting page of the video in response to the editing instruction.

In some embodiments, after the shooting process of the video in the segmented shot mode is completed, the method further comprises: receiving an adjustment instruction for a volume of the video; and adjusting a volume of the audio and/or a volume of the original sound in at least one segment of the video in response to the adjustment instruction.

In a second aspect, an electronic device is provided in the present disclosure. The electronic device comprises: a memory and a processor, wherein the memory is configured to store program instructions, the processor is configured to call the program instructions in the memory so that the electronic device implements the video processing method for the application in the first aspect as well as any possible design of the first aspect.

In a third aspect, a non-transitory computer storage medium is provided in the present disclosure. The computer storage medium comprises computer instructions wherein an electronic device implements the video processing method for the application in the first aspect as well as any possible design of the first aspect when the computer instructions run on the electronic device.

In a fourth aspect, a computer program product is provided in the present disclosure. A computer implements the video processing method for an application in the first aspect as well as any possible design of the first aspect when the computer program product runs on the computer.

BRIEF DESCRIPTION OF THE DRAWINGS

The accompanying drawings herein which are incorporated into the specification and constitute a part of the specification, illustrate the embodiments conforming to the present disclosure, and are intended to explain the principles of the present disclosure together with the specification.

In order to more explicitly describe the technical solution in the embodiments of the present disclosure or the prior art, a brief introduction of the accompanying drawings required be used in the description of the embodiments or the prior art will be made below. Obviously, for those of ordinary skill in the art, other accompanying drawings may also be obtained based on these accompanying drawings when no inventive effort is involved.

DETAILED DESCRIPTION

Figure 1A:
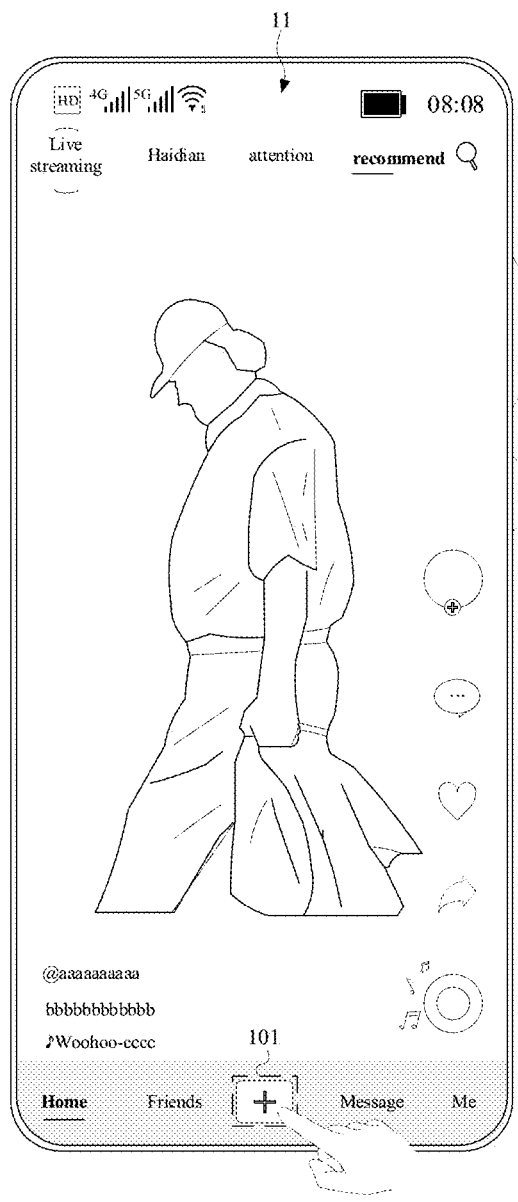
FIGS. 1A-1O are schematic views of human-computer interaction interfaces provided in embodiments of the present disclosure.

In order to be able to understand the above-described objects, features and advantages of the present disclosure more clearly, the solution of the present disclosure will be further described below. It should be noted that, the embodiments of the present disclosure and the features in the embodiments may be combined with each other in the case where there is no conflict.

In the following description, although many specific details are elaborated in order to adequately understand the present disclosure, the present disclosure may also be implemented in other manners different from those described here. Apparently, the embodiments in the specification are only some of the embodiments of the present disclosure, rather than all of the embodiments.

Exemplarily, the present disclosure provides a video processing method for an application, apparatus, device, a computer storage medium, and a computer program product. After an audio selected as the background music in a shooting page of the video in the application is provided in the video to play in the video to be shot, a control may be displayed in the shooting page of the video, wherein the control is used to control whether to record an original sound, so that the user is capable of independently deciding whether to record the original sound during a shooting process of the video based on an operation on the control, thereby adequately respecting the subjective will of the user. Thus, the application supports that the microphone is turned on to record an original sound after the music is selected, and also enables the application to realize a shooting scenario where the background music and the original sound exist in the video at the same time, such as soundtrack singing, rap, recitation, and dubbing commentary, thereby satisfying a shooting expectation and a production appeal of the user in recording an original sound after adding the music and raising the degree of interest of the user in producing a video in the application. In this way, the application provides the user with adequate convenience in production, and encourages more users to produce and publish videos in the application.

The original sound here may be understood as ambient sound.

The video processing method for an application according to the present disclosure is implemented by an electronic device. the electronic device may be a tablet computer, a cell phone (e.g., a folding screen cell phone, a large screen cell phone, or the like), a wearable device, a vehicle-mounted device, an augmented reality (AR)/virtual reality (VR) device, a laptop, an ultra-mobile personal computer (UMPC), a netbook, a personal digital assistant (PDA), and IOT (the internet of things) devices such as a smart television, a smart screen, a high-definition television, a 4K television, a smart speaker, and a smart projector. There is no restriction on the specific type of the electronic device in the present disclosure.

The present disclosure does not limit a type of an operating system of the electronic device, for example, Android system, Linux system, Windows system, iOS system, or the like.

Based on the aforementioned description, in the embodiments of the present disclosure, an electronic device is used as an example to illustrate the video processing method for an application provided by the present disclosure in detail in conjunction with the accompanying drawings and the application scenarios.

In conjunction with FIGS. 1A-1O, the specific implementation process of the video processing method for an application according to the present disclosure will be introduced. For ease of description, in FIGS. 1A to 1O, the electronic device is a cell phone installed with a short video social application 1 (referred to as application 1) as an example for illustration.

Please refer to FIGS. 1A-1O, which are schematic views of human-computer interaction interfaces provided in embodiments of the present disclosure.

The application 1 may display a user interface 11 exemplarily shown in FIG. 1A on the cell phone. The user interface 11 is configured to display a homepage of the application 1, and the application 1 performs a certain function set in the homepage of the application 1, for example playing multimedia information (e.g., a short video).

The user interface 11 comprises a control 101 for entering a production page of the application 1. The production page is used to provide tools for the user to produce a video and to display a screen for the video produced by the user. The present disclosure does not limit parameters such as the shape, size, color and position of the control 101.

Figure 1B:
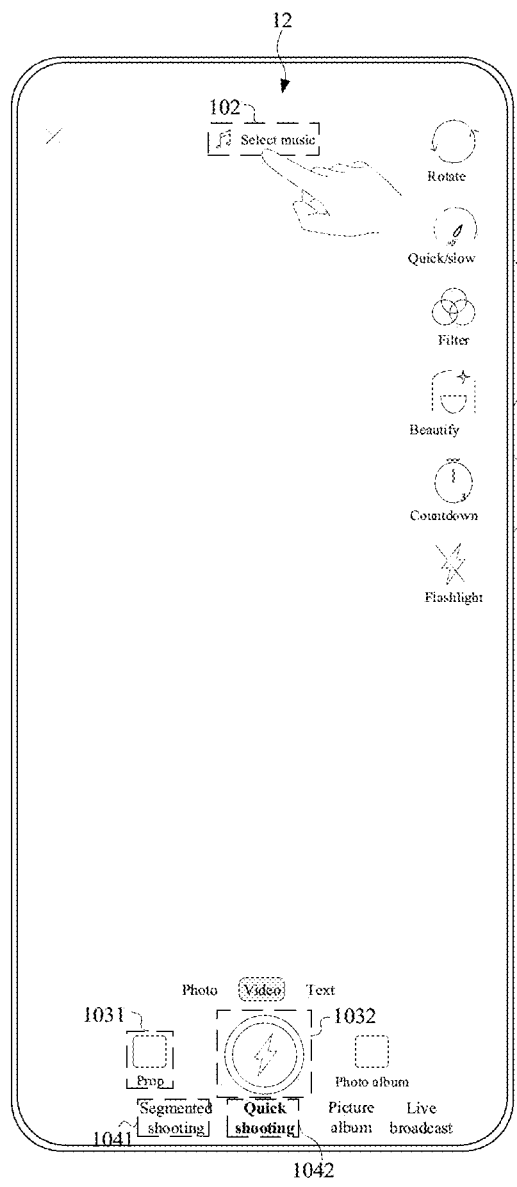

After the application 1 receives the user's operation such as clicking the control 101 in the user interface 11 shown in FIG. 1A, the application 1 displays a user interface 12 exemplarily shown in FIG. 1B on the user interface 11, wherein the user interface 12 is configured to display a production page of the application 1.

The user interface 12 comprises a control 102, a control 1031, a control 1032, a control 1041, and a control 1042.

The control 102 is configured to provide the user with an access to select and edit the audio before a video is shot in real time, and to display a name of the audio selected by the user. The present disclosure does not limit parameters such as the shape, size, color and position of the control 102.

The control 1031 is configured to provide the user with an access to select a prop before the video is shot in real time and to display a name of the prop selected by the user. The prop here may be understood as a factor that affect the playback effect of the video, for example changing a makeup of a person. The present disclosure does not limit parameters such as the shape, size, color and position of the control 1031.

The control 1032 is configured to provide an access for the user to start shooting a video before the video is shot in real time. The present disclosure does not limit parameters such as the shape, size, color and position of the control 1032.

The control 1041 is configured to provide the user with a segmented shot mode of the video before the video is shot in real time. The present disclosure does not limit parameters such as the shape, size, color and position of the control 1041.

The control 1042 is configured to provide the user with a quick shot mode of the video before the video is shot in real time. The present disclosure does not limit parameters such as the shape, size, color and position of the control 1042.

In addition, after a shot mode of the video is selected, the control 1041 or the control 1042 may be prominently displayed in such a manner as highlighting or blackening. For example, if the shot mode selected by the application 1 is the quick shot mode, the control 1042 is displayed in black in the user interface 12 shown in FIG. 1B.

In summary, a microphone control is not displayed, and the application supports recording of the original sound by default in the case where background music is not added in the video.

Figure 1C:

After the application 1 receives the user's operation such as clicking the control 102 in the user interface 12 shown in FIG. 1B, the application 1 can display a page 13 exemplarily shown in FIG. 1C on the user interface 12, wherein the page 13 is configured to provide an audio that can be applied in the video.

The page 13 comprises an area 105 configured to display information related to an audio 1, for example a song name 1, an account of a singer a, a cover of the audio 1, and 32-second playback duration of the audio 1, and to provide an access for selecting (using) the audio 1 and an access for editing the audio 1.

Figure 1D:
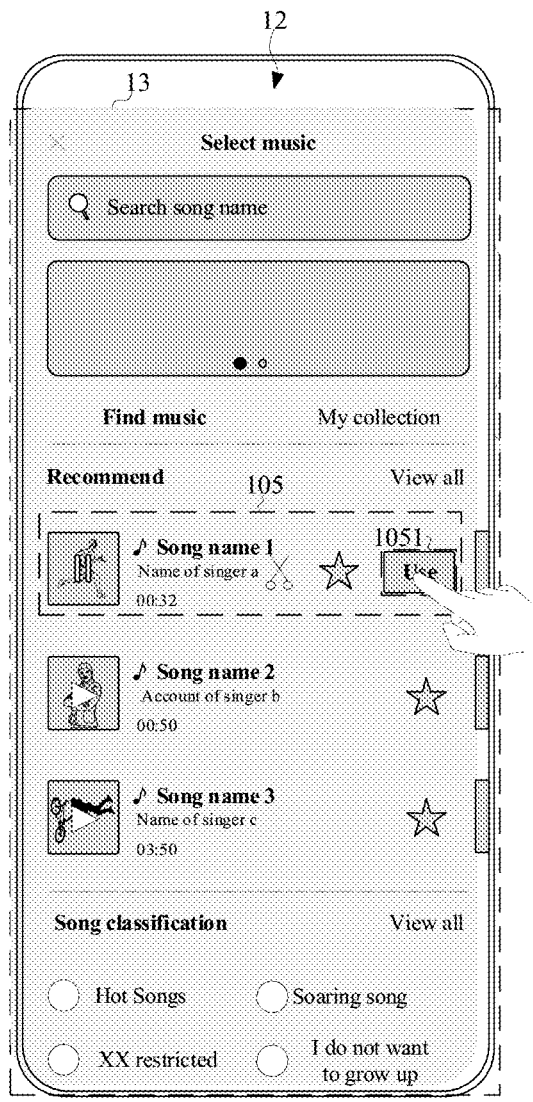

After the application 1 receives the user's operation such as clicking in the area 105 shown in FIG. 1C, the application 1 can display a control 1051 exemplarily shown in FIG. 1D on the area 105, wherein the control 1051 is configured to provide an access for selecting (using) the audio 1.

1. After the audio 1 is selected, a microphone control (i.e., the control 1061 or the control 1062) is displayed.

After the application 1 receives the user's operation such as clicking the control 1051 tin the area 105 shown in FIG. 1D, the application 1 can display a newly added control 1061 exemplarily shown in FIG. 1E on the user interface 12. In addition, FIG. 1E also shows an updated control 102 to indicate that background music is added to the video.

The control 102 is configured to display the name of the selected audio 1, for example the song name 1. The control 1061 is configured to control not to record an original sound, and to provide an access for recording the original sound. The present disclosure does not limit parameters such as the shape, size, color and position of the control 1061.

In addition, the application 1 can provide a dithered display of the control 1061 on the user interface 12, which helps to prompt the user to choose whether to turn on the microphone to record an original sound based on the subjective will of the user.

In summary, during the process of adding the background music to the video, the microphone control may be displayed in the case where the background music is added to the video, thereby satisfying the appeal of the user that it is possible to record ambient sound after adding the background music to the video based on the microphone control.

In addition, after the application 1 receives another operation performed by the user such as returning to the user interface 12 than clicking the control 1051 in the area 105 shown in FIG. 1D, the application 1 can display the user interface 12 exemplarily shown in FIG. 1B on the cell phone. The user interface 12 does not comprise the newly added control 1061. In addition, optionally, the user interface 12 does not comprise the updated control 102, which is used to indicate that no background music is added to the video.

In summary, during the process of adding the background music to the video, the microphone control may not be displayed in the case where no background music is added to the video, thereby realizing the dynamic display of the microphone control.

2. A state of the microphone control is changed.

After the application 1 receives the user's operation such as clicking the control 1061 in the user interface 12 shown in FIG. 1E, the application 1 can change from displaying the control 1061 on the user interface 12 to displaying the control 1062 exemplarily shown in FIG. 1F.

The control 1062 is configured to control the recording of an original sound, and provides an access for not recording an original sound. The present disclosure does not limit parameters such as the shape, size, color and position of the control 1062. In addition, the control 1061 and the control 1062 may be arranged in the same position on the user interface 12.

In addition, the application 1 can display a prompt content 107 within a first preset time period at the same time when the application 1 displays the control 1062 exemplarily shown in FIG. 1F on the user interface 12.

The prompt content 107 is configured to prompt the user that the video recorded using an earphone presents a favorable effect, so as to be able to obtain an original sound with a better effect. The first preset time period is a duration of displaying the prompt content 107 on the user interface 12. The present disclosure does not limit the duration of the first preset time period. In addition, the present disclosure does not limit a display mode and a display position of the prompt content 107. In some embodiments, the prompt content 107 may be a Toast message box prompt.

It should be noted that, in addition to the above-described display mode, after the audio 1 is selected, the application 1 can also record an original sound by default. That is, after the application 1 receives the user's operation such as clicking the control 1051 in the area 105 shown in FIG. 1D, the application 1 can display the newly added control 1062 exemplarily shown in FIG. 1F on the user interface 12, and display the prompt content 107 within the first preset time period.

In this way, after the application 1 receives the user's operation such as clicking the control 1062 in the user interface 12 shown in FIG. 1F, the application 1 can change from displaying the control 1062 on the user interface 12 to displaying the control 1061 exemplarily shown in FIG. 1E.

Figure 1G:
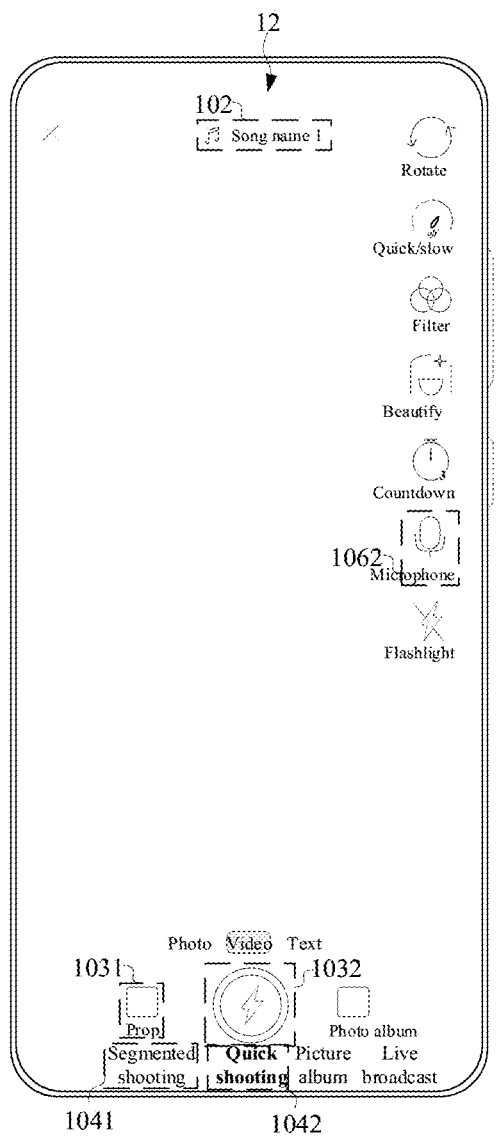

After the prompt content 107 disappears, the application 1 can display the user interface 12 exemplarily shown in FIG. 1G on the cell phone, and the user interface 12 at this time may comprise the control 102, the control 1062, the control 1031, the control 1032, the control 1041 and the control 1042.

In summary, whether to record ambient sound may be determined based on an operation selection of the user on the microphone control after the background music is added to the video, thereby adequately respects the subjective will of the user and offering the user a degree of freedom to produce in the application.

The control 1062 in FIG. 1G is in an on state, which indicates that recording of the original sound is supported.

Figure 1H:
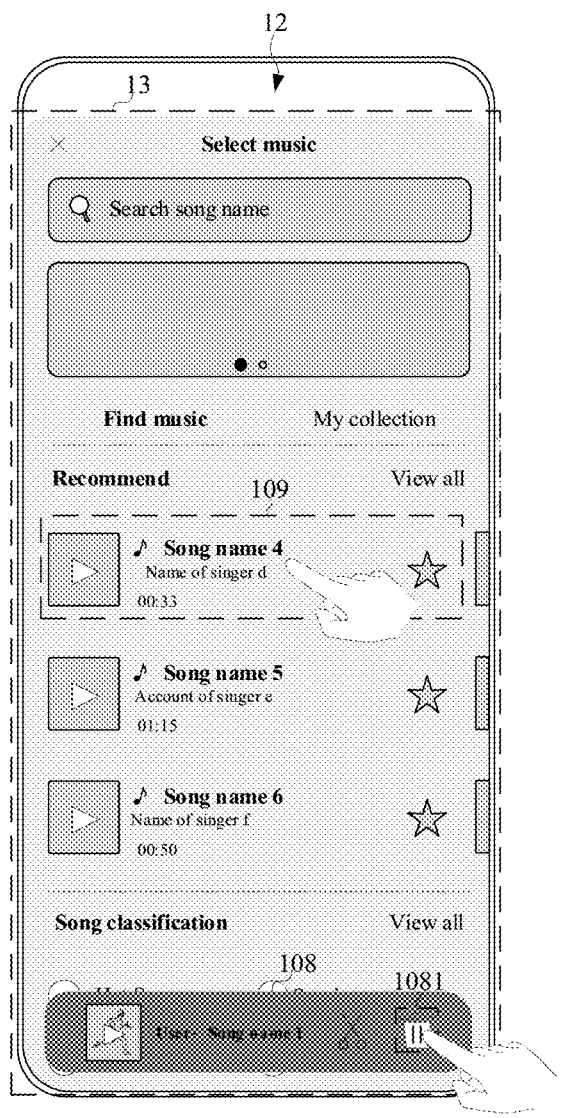

After the application 1 receives the user's operation such as clicking the control 102 in the user interface 12 shown in FIG. 1G, the application 1 can display the updated page 13 exemplarily shown in FIG. 1H on the user interface 12, and displays a window 108 exemplarily shown in FIG. 1H on the updated page 13.

The page 13 shown in FIG. 1H and the page 13 shown in FIG. 1C may typically provide different audios. The page 13 comprises an area 109 configured to display the information related to an audio 2, for example a song name 4, an account of a singer d, a cover of the audio 2, and 33-second playback duration of the audio 2, and to provide an access for selecting (using) the audio 2 and an access for editing the audio 2.

3. The audio 1 is replaced by the audio 2.

After the application 1 receives the user's operation such as clicking in the area 109 shown in FIG. 1H, the application 1 can display the control 1091 exemplarily shown in FIG. 1I on the area 109, wherein the control 1091 is configured to provide an access for selecting (using) the audio 2. The present disclosure does not limit parameters such as the shape, size, color and position of the control 1091.

After the application 1 receives the user's operation such as clicking the control 1091 in the area 109 shown in FIG. 1I, the application 1 can display the updated control 102 exemplarily shown in FIG. 1J on the user interface 12, and remain in displaying the control 1062. The control 102 is configured to display a name of the selected audio 2, for example a song name 4.

In summary, after the background music is added to the video and the microphone control is in an on state, if the background music is replaced at this time, the microphone control still remains an on state. Therefore, there is no need to ensure that the application still supports the function of recording an original sound after the background music is replaced.

4. The audio 1 is canceled.

In FIG. 1H, the window 108 is configured to provide the user with an access to edit and cancel the audio 1. The window 108 comprises a control 1081 for providing the user with an access to cancel the audio 1. The present disclosure does not limit parameters such as the shape, size, color and position of the control 1081.

After the application 1 receives the user's operation such as clicking the control 1081 in the window 108 shown in FIG. 1H, the application 1 can display the user interface 12 exemplarily shown in FIG. 1B on the cell phone, and the control 1061 and the control 1062 are not displayed in the user interface 12 at this time.

It should be noted that, in addition to the mode that the control 1061 and the control 1062 are not displayed in the user interface 12, the application 1 can also provide a grayscale display of the control 1062 shown in FIG. 1G in the user interface 12. The grayscale display mentioned in the present disclosure may be understood as the application 1 shielding an operation performed by the user on the control.

In summary, after the background music is added to the video, the user is provided with a microphone control for selecting whether to record ambient sound, and after there is no background music added to the video, the user is no longer provided with a microphone control. Therefore, the microphone control may be dynamically displayed in a shooting page of the video, which is favorable for the application to flexibly display the content of the page based on actual conditions.

5. The display state of the microphone control after the prop 1 is selected

Figure 1K:
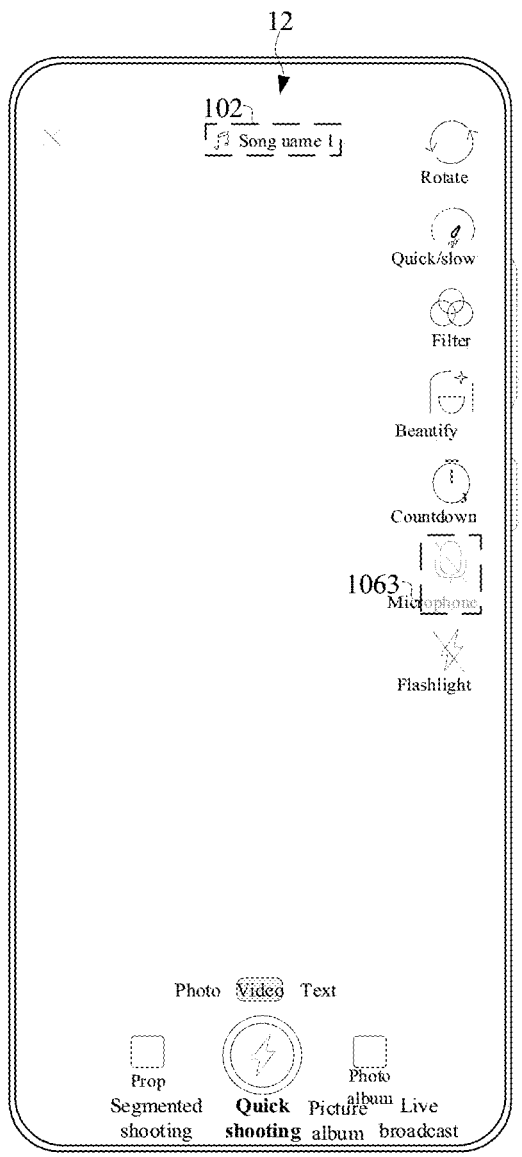

After the user selects the prop 1 with the control 1031 in the user interface 12 shown in FIG. 1G, since the prop 1 does not support recording of an original sound, the application 1 may change from displaying the control 1062 exemplarily shown in FIG. 1G to displaying the control 1063 exemplarily shown in FIG. 1K on the user interface 12.

The control 1063 is configured to indicate that it is in an off state and does not support changing of a state. The present disclosure does not limit parameters such as the shape, size, color and position of the control 1063. In some embodiments, the control 1063 may provide a grayscale display in the user interface 12, or may not be displayed in the user interface 12.

In addition, the application 1 can display a prompt content within a second preset time period at the same time when the application 1 displays the control 1063 exemplarily shown in FIG. 1K on the user interface 12. The prompt content is configured to prompt that the props used by the user do not support recording of the original sound. The second preset time period is a duration of displaying the prompt content on the user interface 12, and the present disclosure does not limit the duration of the second preset time period. In addition, the present disclosure does not limit a display mode and a display position of the prompt content. In some embodiments, the prompt content may be a Toast message box prompt.

In summary, after the background music is added to the video, factors such as whether to add props that do not support recording of the original sound in the video 1 are adequately considered and the display state of the microphone control is adjusted in time, so as to prompt the user whether the application supports recording of the original sound.

6. The shot mode of the video is selected.

In FIG. 1G, the control 1041 in the user interface 12 is displayed normally and the control 1042 is displayed in bold, which indicates that the shot mode of the video is a quick shot mode.

Figure 1L:
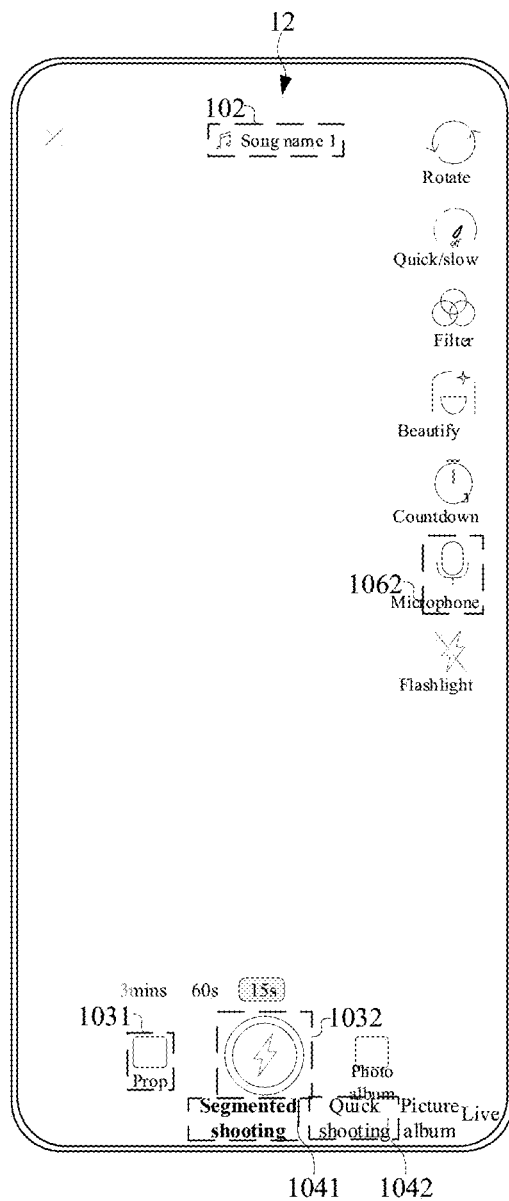

After the application 1 receives the user's operation such as clicking the control 1042 in the user interface 12 shown in FIG. 1G, the application 1 can display the user interface 12 exemplarily shown in FIG. 1L on the cell phone, and the control 1041 in the user interface 12 at this time is displayed in bold and the control 1042 is displayed normally, which indicates that the shot mode of the video is a segmented shot mode.

In summary, it is also possible to satisfy an appeal of the user that ambient sound may be recorded after the background music is added to the video whilst also supporting changing of a shot mode of the video based on the microphone control.

7. The video 1 is shot.

The application 1 can use the configured audio 1 to shoot the video whilst also recording an original sound (i.e., ambient sound) based on the selected audio 1 and the displayed control 1062 shown in FIG. 1G or FIG. 1L.

It should be noted that, a microphone sound of an electronic device is used as the original sound in the video 1 by adopting a low delay echo cancelling technology in a case where the user does not use an earphone to shoot the video 1. A microphone sound of the earphone can be used as the original sound in the video 1 in a case where the user uses the earphone to shoots the video 1. This makes the collected original sound has less noise and a better signal, which is favorable for ensuring the playback effect of the video.

In addition, in the case where the video 1 adopts a segmented shot mode, before the shot of the video 1 begins, the application 1 can determine whether to record an original sound based on whether the display control 1062 or the display control 1061 is in the user interface 12.

On the one hand, after the shot of a segment of the video 1 is paused, the application 1 may not support the user to select whether to record an original sound during a shooting process of each segment of the video 1. Therefore, the application 1 may display the control 1062 or the control 1061 that does not support changing of a state in the user interface 12, for example providing a grayscale display or not displayed.

On the other hand, after the shot of a segment of the video 1 is paused, the application 1 may support the user to select whether to record an original sound during a shooting process of each segment of the video 1. Therefore, the application 1 may display the control 1062 or the control 1061 in the user interface 12 to facilitate determining whether to record an original sound in a segment of the video 1 based on the selection of the user.

Figure 1M:
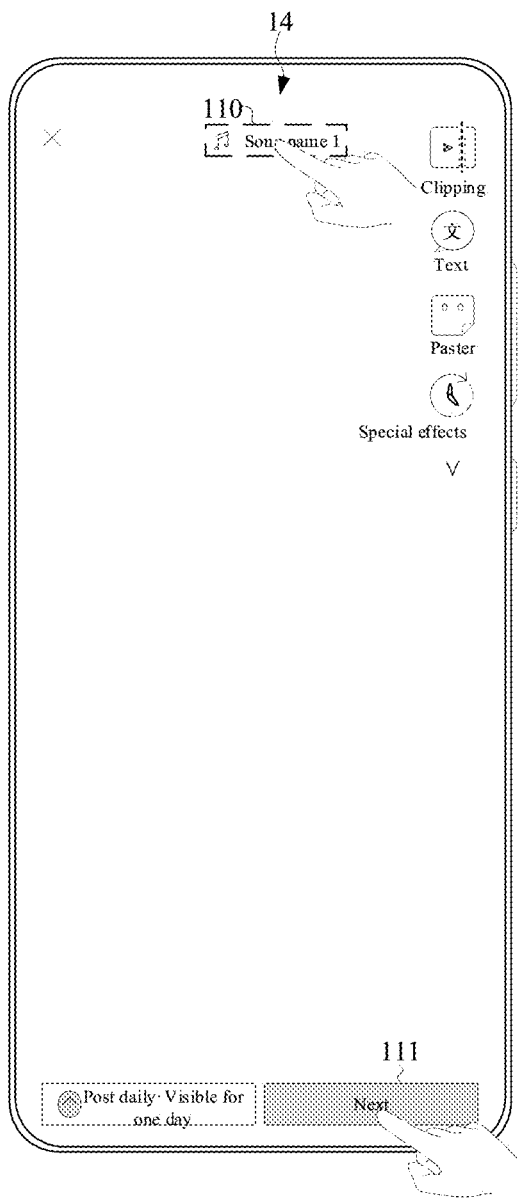

After the shooting process of the video is completed, the application 1 can display a user interface 14 exemplarily shown in FIG. 1M on the cell phone. The user interface 14 is configured to display the video 1 that has been collected in real time, to provide the user with an access to change the audio 1, to provide the user with an access to change the volume of the video 1 and to provide the user with an access to publish the video 1.

In FIG. 1M, the user interface 14 comprises a control 110 and a control 111. The present disclosure does not limit parameters such as the shape, size, color and position of the control 110 and the control 111.

The control 110 is configured to provide the user with an access to change the audio 1, to provide the user with an access to adjust the volume of the video 1, and to display a name of the selected audio 1. The control 111 is configured to provide the user with an access to publish the video 1.

8. The volume of the video 1 is adjusted.

Figure 1N:
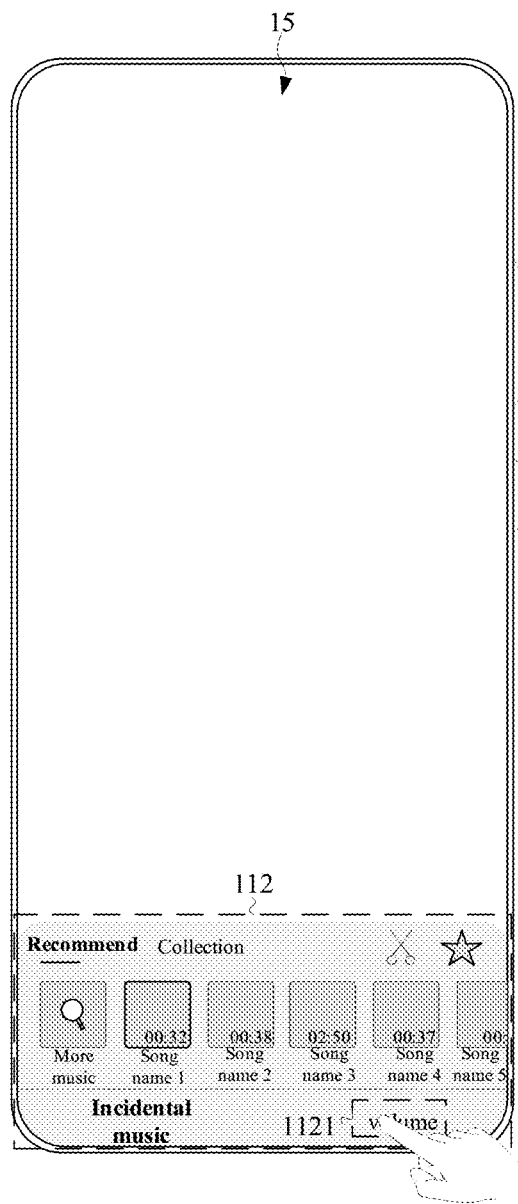
Figure 10:
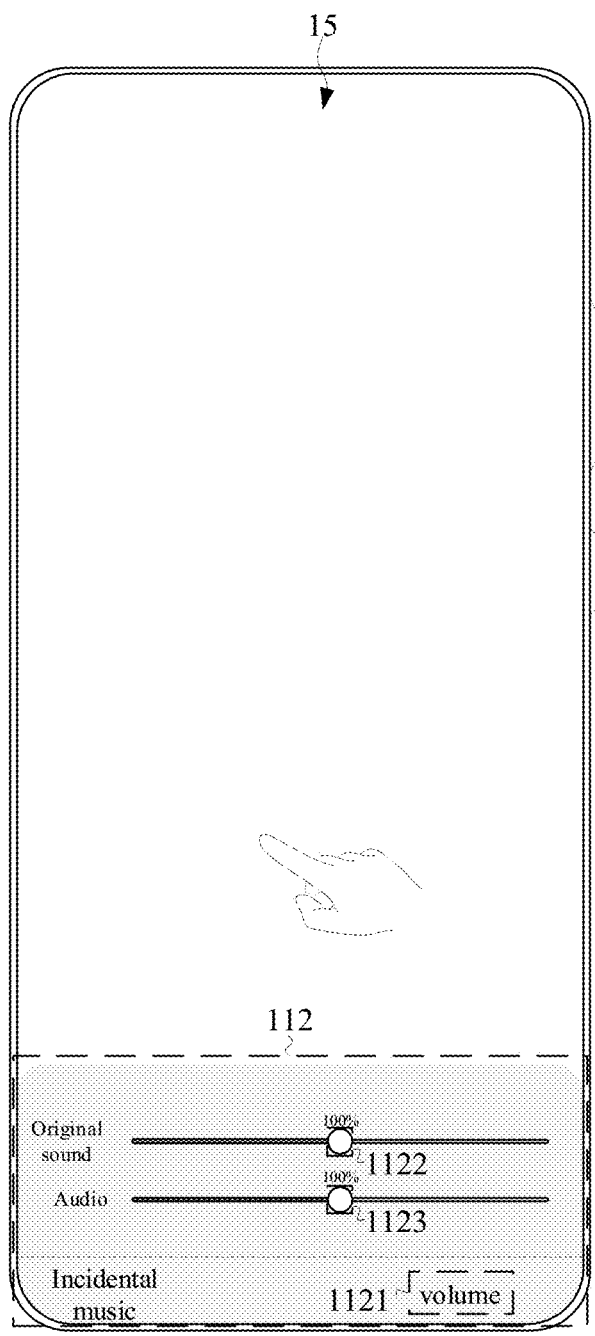

After the application 1 receives the user's operation such as clicking the control 110 in the user interface 14 shown in FIG. 1M, the application 1 can display a user interface 15 exemplarily shown in FIG. 1N on the cell phone. The user interface 15 is configured to provide an audio that can be used by the user in the video 1 and to provide the user with an access to adjust the volume of the video 1.

The user interface 15 comprises a window 112 configured to provide the user with an access to change the audio 1 and an access to adjust the volume of the video 1. The window 112 comprises a control 1121 configured to provide the user with an access to adjust the volume of the video 1. The present disclosure does not limit parameters such as the shape, size, color and position of the window 112 and the control 1121.

After the application 1 receives the user's operation such as clicking the control 1121 in the window 112 shown in FIG. 1N, the application 1 can display an updated window 112 exemplarily shown in FIG. 1O on the user interface 15.

In FIG. 1O, the updated window 112 comprises a control 1122 and a control 1123. The present disclosure does not limit parameters such as the shape, size, color and position of the control 1122 and the control 1123.

The control 1122 is configured to provide the user with an access to adjust the volume of the original sound in the video 1. The control 1123 is configured to provide the user with an access to adjust the volume of the audio 1 in the video 1.

In addition, the volume of the original sound in the video 1 and the volume of the audio 1 in the video 1 can also be displayed in the updated window 112 in real time. For example, a display mode of a digital and/or volume bar is used. In addition, the volumes of the audio 1 and the original sound in the video 1 is 100% by default.

It should be noted that, in addition to the mode of adjusting the volume of the video 1 in the embodiment shown in FIG. 1O, the application 1 can also display the volume ratio of the original sound and the audio 1 in the video 1 on the cell phone, so as to adjust the volume of the video 1. Moreover, the present disclosure is not limited to the two implementations described above.

In addition, in the case where the video 1 adopts a segmented shot mode, and in the case where the user is intended to change the volume of the video 1, the application 1 can display components for adjusting the volume of each segment in the video 1 on the cell phone respectively. For example, different options are displayed in one window, wherein each option corresponds to one segment in the video 1, and each option corresponds to one page of the window. For this page, please refer to the description of the updated window 112 shown in FIG. 1O. Thus, the volumes of the original sound and the audio 1 in a corresponding segment of the video 1 are adjusted based on an operation on the component.

9. The video 1 is published.

After the volume of the video 1 is adjusted, and after the application 1 receives the user's operation in the user interface 15 shown in FIG. 1O, such as clicking on an area other than the window 112 in the user interface 15, the application 1 can display the user interface 14 exemplarily shown in FIG. 1M on the cell phone.

After the application 1 receives the user's operation such as clicking the control 111 in the user interface 14 shown in FIG. 1M, the application 1 can publish the video 1 to the application 1 so that it can be viewed by a related user in the application 1.

Based on the description of the embodiments in FIGS. 1A-1O, in conjunction with FIG. 2, the specific implementation process of the video processing method for an application provided by the present disclosure will be described in detail.

Figure 2:
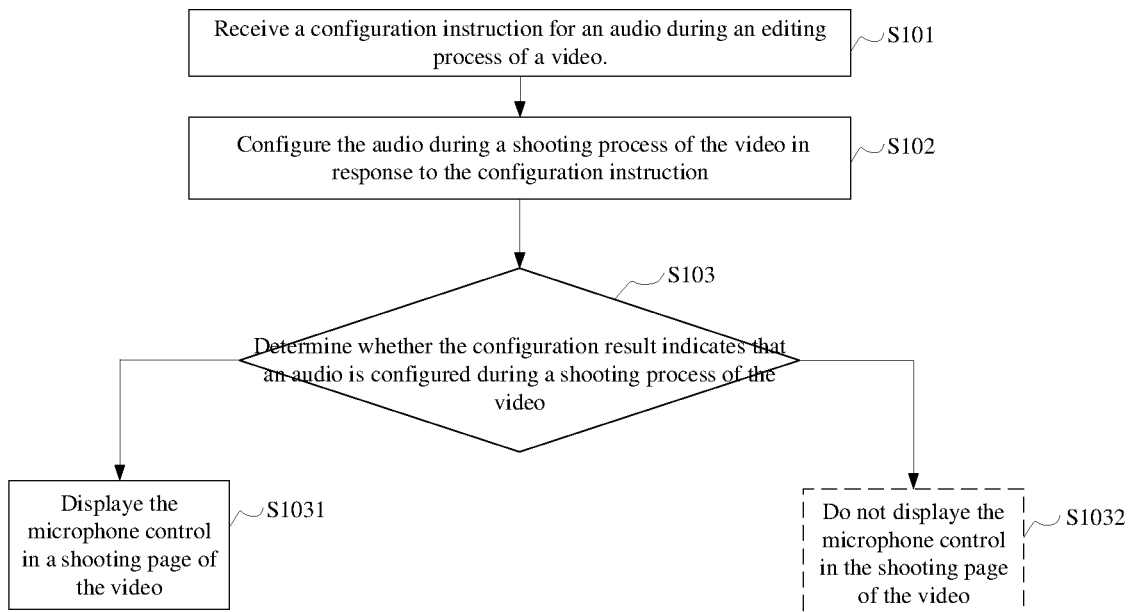
FIG. 2 is a schematic flowchart of a video processing method for an application provided in an embodiment of the present disclosure.

Please refer to FIG. 2, which is a schematic flowchart of a video processing method for an application provided in an embodiment of the present disclosure. As shown in FIG. 2, the video processing method for an application provided by the present disclosure may comprise steps S101 to S1032.

At step S101, a configuration instruction for an audio is received during an editing process of a video.

The video mentioned here is a video that the user uses the application but has not started to produce. The editing process of the video is understood as a processes such as adding a background music, and adding a prop for affecting the playback effect of the shot video before shooting the video.

The audio is an audio provided by the application, for example a complete song, or a partial segment of a song, or a cut audio segment, or the like.

The configuration instruction is configured to use the audio as the background music of the video, so that the audio can be played along with the playback of the video. The present disclosure does not limit the specific implementation of the configuration instruction. The configuration instruction may comprise, but is not limited to an operation such as click, double-click, long-press or sliding. For example, in the case where a control for editing an audio is provided on a page of the application (as shown in the area 105 in the embodiment of FIG. 1D), the configuration instruction is an operation received on the control.

In some embodiments, in the case where the application is the application 1 in FIGS. 1A-1O, and the audio is the audio 1 in the embodiments of FIGS. 1A-1O, for the specific implementation of the configuration instruction, reference may be made to the description of the operation such as clicking the control 1051 performed by the user in the area 105 in the embodiment of FIG. 1D, and thus it will not be described in detail here.

At step S102, the audio is configured during a shooting process of the video in response to the configuration instruction.

After receiving the configuration instruction, the electronic device configures the audio during the shooting process of the video. The process of configuring the audio by the electronic device during the shooting process of the video can be understood as a process of configuring the audio corresponding to the configuration instruction to the video, for example the processes of the user selecting the audio and adjusting the parameters of the audio.

At step S103, Whether the configuration result indicates that an audio is configured during a shooting process of the video is determined.

The configuration result is obtained during the process of configuring the audio by the electronic device during the shooting process of the video. The configuration result is used to indicate whether an audio is configured during the shooting process of the video. The present disclosure does not limit the specific implementation of the configuration result.

In the case where the configuration result indicates that an audio is configured during the shooting process of the video, it may be understood that the audio corresponding to the configuration instruction has been configured to the video, so that the aforementioned audio can be played along with the playback of the video. In the case where the configuration result indicates that the audio is not configured during the shooting process of the video, it may be understood that the audio corresponding to the configuration instruction has not been configured to the video, so that the aforementioned audio cannot be played along with the playback of the video.

Therefore, the electronic device executes the step S1031 in the case where the configuration result indicates that the audio is configured during the shooting process of the video; and the electronic device executes the step S1032 in the case where the configuration result indicates that the audio is not configured during the shooting process of the video.

At step S1031, the microphone control is displayed in a shooting page of the video.

The electronic device may display the microphone control in the shooting page of the video in the case where the configuration result indicates that the audio is configured during the shooting process of the video.

At step S1032, the microphone control is not displayed in the shooting page of the video.

The electronic device may not display the microphone control in the shooting page of the video in the case where the configuration result indicates that the audio is not configured during the shooting process of the video. Thus, the dynamic display of the microphone control is realized.

The shooting page of the video is a page of the application. In some embodiments, the above-described configuration process may be provided in the shooting page of the video. For example, in the case where a control for selecting an audio is provided on a page of the application (as shown in the user interface 12 in the embodiment of FIG. 1B), the above-described configuration process is the process of selecting the background music for the video by way of the control.

In addition, the configuration result may not be displayed in the shooting page of the video, or may be displayed in the shooting page of the video in the form of displaying related parameters of the audio, which is not limited in the present disclosure.

In the present disclosure, the microphone control has two states, that is, an on state and an off state. The default state of the microphone control is the on state or the off state, which is not limited in the present disclosure. Moreover, the microphone control at this time may be switched between these two states. That is, the state of the microphone control may be switched from the on state to the off state, or from the off state to the on state.

Recording of an original sound is configured during the shooting process of the video when the microphone control is in the on state.

The microphone control is turned on, which can be understood in a way such that the microphone control is switched from the off state to the on state by an operation on the microphone control. The aforementioned operation may comprise, but is not limited to the operation such as clicking, double-clicking, long-press or sliding. For example, the aforementioned operation may be the operation performed by the user in the user interface 12 shown in FIG. 1E, such as clicking the control 1061, and the microphone control may be switched from the control 1061 exemplarily shown in FIG. 1E to the control 1062 exemplarily shown in FIG. 1F.

Not recording of the original sound is configured during the shooting process of the video when the microphone control is in the off state.

The microphone control is turned off, which can be understood in a way such that the microphone control is switched from the on state to the off state by an operation on the microphone control. The aforementioned operation may comprise, but is not limited to an operation such as clicking, double-clicking, long-press or sliding. For example, the aforementioned operation may be an operation performed by the user in the user interface 12 shown in FIG. 1F, such as clicking the control 1062, and the microphone control may be switched from the control 1062 exemplarily shown in FIG. 1F to the control 1061 exemplarily shown in FIG. 1E.

The present disclosure does not limit parameters such as the shape, size, color and position of the microphone control. For example, the on state of the microphone control may be displayed by disappearance of a slash on the shape of the microphone. The off state of the microphone control may be displayed by the appearance of the slash on the shape of the microphone.

In some embodiments, in the case where the application is the application 1 in FIGS. 1A-1O, and the audio is the audio 1 in the embodiments of FIGS. 1A-1O, for the specific implementation of the above-described process, reference may be made to the description that the application 1 may display the newly added control 1061 or control 1062 exemplarily shown in FIG. 1E on the user interface 12 after the user in the embodiment of FIG. 1D performs an operation such as clicking the control 1051 in the area 105 shown in FIG. 1D, which will not be described in detail here.

In addition, whether the updated control 102 is still displayed in FIG. 1E may represent the configuration result. In the case where the updated control 102 is also displayed in FIG. 1E, the configuration result indicates that the case that there is an audio configured during the shooting process of the video. In the case where the updated control 102 is not displayed in FIG. 1E, the configuration result indicates that there is no audio configured during the shooting process of the video.

In summary, on the one hand, the microphone control may be used to remind the user that the original sound can be recorded. On the other hand, it is possible to independently control whether to record an original sound based on an operation performed by the user on the microphone control, thereby adequately respecting the subjective will of the user. As a result, it is not only possible to satisfy a production appeal of the user for recording an original sound after adding the background music, but also facilitate improving the playback effect of the video produced by the user.

In the video processing method for an application provided by the present disclosure, the electronic device may receive a configuration instruction for an audio during the editing process of the video. After receiving the configuration instruction, the electronic device may configure the audio during a shooting process of the video, and display a microphone control in a shooting page of the video in the case where a configuration result indicates that the audio is configured during the shooting process of the video. Recording of an original sound is configured during the shooting process of the video when the microphone control is in an on state, and not recording of the original sound is configured during the shooting process of the video when the microphone control is in an off state.

Thus, after the audio selected by the electronic device as the background music in the shooting page of the video in the application is provided to play in the video to be shot, the microphone control is displayed in the shooting page of the video, which is convenient for the user to manually control whether to record an original sound by way of the microphone control. In this way, the application can support the turning on or off of the microphone to record an original sound after the music is selected based on the subjective will of the user, thereby satisfying a shooting expectation and a production appeal of the user in recording an original sound after adding the music, and helping the user to realize a shooting scenario where the background music and the original sound exist in the video at the same time, such as soundtrack singing, rap, recitation, and dubbing commentary by using the application. In this way, it is possible to offer the user adequate production freedom and production convenience, and raise the degree of interest of the user in producing a video in the application, thereby encouraging more users to produce and publish videos in the application.

In addition, in the case where the configuration result indicates that there is no audio configured during the shooting process of the video, the electronic device does not display the microphone control in the shooting page of the video. Thus, the dynamic display of the microphone control is realized.

In some embodiments, in the case where the application is the application 1 in FIGS. 1A-1O, and the audio is the audio 1 in the embodiments of FIGS. 1A-1O, for the specific implementation of the above-described process, reference may be made to the description that the application 1 may display the user interface 12 exemplarily shown in FIG. 1B on the cell phone after the user in the embodiment in FIG. 1D performs other operations such as returning to the user interface 12 than clicking the control 1051 in the area 105 shown in FIG. 1D, wherein the user interface does not comprise the updated user interface 102 and the newly added control 1061 or control 1062, which will not be described in detail here.

Based on the above-described description, in the case where the microphone control is in the on state, after the user replaces the selected audio, the microphone control still remains in the on state.

In some embodiments, the electronic device receives an replacement instruction for the audio. The replacement instruction may comprise, but is not limited to, click, double-click, long-press, slide or other types of operations. For example, in the case where a control for selecting (using) the audio (for example, the control 1091 in the embodiment of FIG. 1I) is provided on a page of the application (for example, the area 109 in the embodiment of FIG. 1I), the replacement instruction is to an operation to replace the audio by way of the control.

Thus, the electronic device may configure a replaced audio during the shooting process of the video and display the microphone control in the shooting page of the video after receiving the replacement instruction.

The audio before the replacement may be the audio 1 in the example of FIG. 1I, and the audio after the replacement may be the audio 2 in the example of FIG. 1I. For the specific implementation of the above-described process, reference may be made to the description that the application 1 displays the updated control 102 exemplarily shown in FIG. 1J on the user interface 12, and remains in displaying the control 1062 after the application 1 receives the user's operation in the area 109 shown in FIG. 1I, such as clicking the control 1091, which will not be described in detail here.

In addition, the electronic device may also cancel the selected audio. At this time, the microphone control is no longer displayed in the shooting page of the video. As a result, the microphone control is dynamically displayed in the shooting page of the video, which is favorable for the application to flexibly display the page content based on actual conditions.

Based on the above-described description, in the case where the microphone control is in the off state, in addition to displaying that the microphone control is in the off state, the electronic device may also configure the microphone control to be displayed ditheringly in the shooting page of the video. Thus, the user is further prompted to choose whether to turn on the microphone to record an original sound based on the subjective will.

Based on the above-described description, in the case where the microphone control is switched from the off state to the on state, in addition to displaying that the microphone control is in the on state, the electronic device may also configure a first prompt content to be displayed in the shooting page of the video within a first preset time period, wherein the first prompt content is configured to prompt the user that the video shot using an earphone presents a favorable effect. Thus, the user is prompted that the application has turned on the microphone to record an original sound.

The present disclosure does not limit the specific implementation of the first prompt content and the first preset time period. For example, the first prompt content may refer to the prompt content 107 exemplarily shown in FIG. 1F.

Based on the above-described description, in the case where it is detected that the microphone control is turned on, the electronic device may record an original sound when shooting a video with the configured audio. The user may use the earphone during the shooting process of the video, or may not use the earphone during the shooting process of the video, which is not limited in the present disclosure.

A microphone sound of the electronic device is used as the original sound by the electronic device adopting a low delay echo cancelling technology in the case where the user does not use an earphone to shoot the video. A microphone sound of the earphone is used as the original sound by the electronic device in the case where the user uses the earphone to shoots the video. Therefore, the collected original sound has less noise and a better signal, which is favorable for ensuring the playback effect of the video.

Based on the above-described description, the electronic device may also adjust the volume of the video after the shooting process of the video is completed. The video mentioned here is the video that the user has taken using the application.

In some embodiments, the electronic device receives an adjustment instruction for the volume of the video. The adjustment instruction may comprise, but is not limited to an operation such as clicking, double-clicking, long-press or sliding. For example, in the case where a control for adjusting the volume of the video 1 (for example, the control 1121 in the embodiment of FIG. 1N) is provided on a page of the application (for example, the window 112 in the embodiment of FIG. 1N), the adjustment instruction is an operation of adjusting the volume of the video by way of the control.

The electronic device adjusts the volume of the audio and/or the volume of the original sound in the video after receiving the adjustment instruction. As a result, the volume of the video is adjusted so that the user can realize a shooting scenario where the background music and the original sound exist in the video at the same time, such as soundtrack singing, rap, recitation, and dubbing commentary by using the application, thereby enhancing an intension of the user to produce a video and share a video in the application.

For the specific implementation of the above-described process, reference may be made to the description that the application 1 displays the updated window 112 shown in FIG. 1O on the user interface 15 after the application 1 receives the user's operation in the window 112 shown in FIG. 1N, such as clicking on the control 1121, which will not be described in detail here.

The present disclosure can apply a plurality of means to adjust the volume of the audio in the video, or the volume of the original sound in the video, or the volume of the audio and the volume of the original sound in the video.

In some embodiments, the electronic device receives an editing instruction for the volume of the video. The editing instructions may comprise, but are not limited to an operation such as click, double-click, long-press or sliding. For example, in the case where a control for adjusting the volume of the video 1 (for example, the control 1121 in the embodiment of FIG. 1N) is provided on a page of the application (for example, the window 112 in the embodiment of FIG. 1N), the editing instruction is an operation of adjusting the volume of the video by way of the control.

The electronic device can display a first control and a second control on a volume editing page of the video after receiving the editing instruction. The first control is configured to adjust the volume of the audio, and the second control is configured to adjust the volume of the original sound.

The present disclosure does not limit parameters such as the shapes, sizes, colors and positions of the first control and the second control. For example, the volume editing page of the video is the updated window 112 in the embodiment in FIG. 1O, the first control is the control 1123 in the embodiment in FIG. 1O, and the second control is the control 1122 in the embodiment in FIG. 1O.

Thus, the electronic device can receive an adjustment instruction on the first control to adjust the volume of the audio in the video, or can receive an adjustment instruction on the second control to adjust the volume of the original sound in the video, or can receive adjustment instructions on the first control and the second control to adjust the volume of the audio and the volume of the original sound in the video.

In other embodiments, the electronic device receives an editing instruction for the volume of the video. The editing instruction refers to the aforementioned description, which will not be described in detail here. The electronic device can display an adjustment control on a volume editing page of the video after receiving the editing instruction, wherein the adjustment control is configured to adjust a volume ratio of the audio and the original sound. The present disclosure does not limit parameters such as the shape, size, color and position of the adjustment control. Thus, the electronic device can receive the adjustment instruction on the adjustment control to adjust the volume of the audio and the volume of the original sound in the video.

In addition, after receiving the editing instruction, in addition to adjusting the volume of the video, the electronic device may also display the volume of the audio and the volume of the original sound in real time on the volume editing page of the video. The present disclosure does not limit the display mode of the volume. For example, the volume is displayed as a numerical percentage. As a result, the volumes of the audio and the original sound in the video can be displayed to the user intuitively, which is favorable for the user to adjust the volume of the video in a timely and accurate manner.

Based on the above-described description, during the editing process of the video, the electronic device may also add a prop before the video is shot to add fun to the production of the video, which is favorable for improving the playback effect of the produced video. The video mentioned here is a video that the user uses the application but has not started to produce, and the prop is configured to affect the playback effect of the video that has been shot.

In some embodiments, the electronic device receives a configuration instruction for the prop. The aforementioned prop is not only used to affect the playback effect of the video, and but also used for not supporting recording of the original sound.

The configuration instructions may comprise, but are not limited to an operation such as click, double-click, long-press or sliding. For example, in the case where a control for selecting the prop for a video (for example, the control 1031 in the embodiment of FIG. 1G) is provided on a page of the application (for example, the user interface 12 in the embodiment of FIG. 1G), the configuration instruction is an operation of adding the prop to the video by way of the control.

Thus, after receiving the configuration instruction, the electronic device can configure the prop during the shooting process of the video, and display the microphone control that is in the off state and does not support changing of the state in the shooting page of the video.

For the specific implementation of the above-described process, reference may be made to the description that the application 1 changes from displaying the control 1062 exemplarily shown in FIG. 1G on the user interface 12 to displaying the control 1063 exemplarily shown in FIG. 1K after the user selects the prop 1 in the user interface 12 shown in FIG. 1G by way of the control 1031, which will not be described in detail here.

Thus, after the background music is added to the video, the factors such as whether to add prop that do not support recording of the original sound in the video can be adequately considered, and the display state of the microphone control is adjusted in time, so as to prompt the user whether the application supports recording of the original sound.

In addition, in addition to changing a state of the microphone control, the electronic device can display a second prompt content in the shooting page of the video during a second preset time period, wherein the second prompt content is configured to prompt the user that the prop does not support recording of the original sound. As a result, the user is prompted that the application cannot turn on the microphone to record the original sound.

The present disclosure does not limit the specific implementations of the second prompt content and the second preset time period. For example, the second prompt content refers to the description of the prompt content exemplarily shown in FIG. 1K, which will not be described in detail here.

Based on the above-described description, the application can provide the user with a plurality of video shooting modes, for example, a quick shot mode, a segmented shot mode, an album shot mode, a live shot mode, and the like.

In the case of shooting the video in a segmented shot mode, after the shot of a segment of the video is paused, the microphone control may not support changing of the state, which reduces the efficiency of producing the video by the application; or the microphone control may also support changing of the state, which increases the possibility of the application in producing the video. The video mentioned here is a video that the user uses the application but has not started the produce.

In some embodiments, the electronic device can receive an editing instruction on the microphone control. The editing instructions may comprise, but are not limited to an operation such as click, double-click, long-press or sliding. The edit instruction is configured to change the state of the microphone control.

After receiving the editing instruction, the electronic device can switch the microphone control from the off state to the on state, and display the microphone control in the on state in the shooting page of the video. At this time, the electronic device can detect that the microphone control is turned on, so that the electronic device can configure recording of the original sound during the shooting process of a segment of the video.

After receiving the editing instruction, the electronic device can switch the microphone control from the on state to the off state, and display the microphone control in the off state in the shooting page of the video. At this time, the electronic device can detect that the microphone control is turned off, so that the electronic device can configure not recording of the original sound during the shooting process of the segment of the video.

In addition, after the shooting process of the video in a segmented shot mode is completed, the electronic device can adjust the overall volume of the video, or the volume of each segment of the video. The present disclosure does not limit the mode of adjusting the volume of the video by the electronic device. The video mentioned here is a video that has been shot by the user using the application.

In some embodiments, the electronic device can receive an adjustment instruction for the volume of the video. The adjustment instruction may comprise, but is not limited to an operation such as click, double-click, long-press or sliding. The adjustment instruction is configured to adjust the volume of the video. Thus, after receiving the adjustment instruction, the electronic device can adjust the volume of the audio and/or the volume of the original sound in at least one segment of the video.

As a result, the volume of the video is adjusted so that the user can realize a shooting scenario where the background music and the original sound exist in the video at the same time, such as soundtrack singing, rap, recitation, and dubbing commentary by using the application, thereby enhancing an intension of the user to produce a video and share a video in the application.

Exemplarily, the present disclosure provides a video processing device for an application, which may be used to implement the technical solution in the embodiments described in the above-described video processing method for an application. The implementation principles and technical effects are similar and will not be described in detail here.

Exemplarily, the present disclosure provides an electronic device. The electronic device comprises: one or more processors; a memory; and one or more computer programs; wherein the one or more computer programs are stored in the memory; and the electronic device implements the video processing method for the application in the aforementioned embodiments when the one or more processors execute the one or more computer program.

Exemplarily, the present disclosure provides a chip system, which is applied to an electronic device comprising a memory and a sensor. The chip system comprises a processor which implements the video processing method for the application in the aforementioned embodiments.

Exemplarily, the present disclosure provides a non-transitory computer-readable storage medium having a computer program stored thereon, so that the electronic device implements the video processing method for the application in the aforementioned embodiments when the computer program is executed by a processor.

Exemplarily, the present disclosure provides a computer program product, wherein a computer implements the video processing method for the application in the aforementioned embodiment when the computer program product runs on the computer.

In the above-described embodiments, all or some of the functions may be implemented by software, hardware, or a combination of software and hardware. In the case where software is used for implementation, it may be implemented in the form of a computer program product in whole or in part. The computer program product comprises one or more computer instructions. When the computer program instructions are loaded and executed on the computer, the procedures or functions according to the embodiments of the present disclosure are produced in whole or in part. The computer may be a general-purpose computer, a special-purpose computer, a computer network, or other programmable devices. The computer instructions may be stored in a computer-readable storage medium. The computer-readable storage medium may be any available medium that can be accessed by a computer or a data storage device such as a server or a data center integrated with one or more available media. The available medium may be a magnetic medium (for example, a floppy disk, a hard disk, and a magnetic tape), an optical medium (for example, DVD), or a semiconductor medium (for example, a solid state disk (SSD)), or the like.

It should be noted that, relational terms such as "first" and "second" herein are only intended to distinguish one entity or operation from another entity or operation, and do not necessarily require or imply any such actual relationship or sequence between these entities or operations. Moreover, the terms "comprise", "include" or any other variants thereof are intended to cover non-exclusive inclusions, so that a process, method, object or device comprising a series of elements not only comprises those elements, but also comprises those that are not explicitly listed, or further comprises inherent elements for this process, method, object or device. In the case where there are no more restrictions, the element defined by the sentence "comprising a . . . " does not exclude the existence of other identical elements in the process, method, object, or device that comprises the element.

The above are only specific implementations of the present disclosure, so that those skilled in the art can understand or implement the present disclosure. Multiple modifications to these embodiments will be obvious to those skilled in the art, and the general principles defined herein may be implemented in other embodiments without departing from the spirit or scope of the present disclosure. Therefore, the present disclosure will not be limited to the embodiments described herein, but shall conform to the widest scope consistent with the principles and novel features disclosed herein.

What is claimed is:

1. A video processing method for an application, comprising:
  receiving a configuration instruction for an audio; and
  configuring the audio during a shooting process of the video in response to the configuration instruction, and displaying a microphone control in a shooting page of the video in a case where a configuration result indicates that the audio is configured during the shooting process of the video;
  wherein recording of an original sound is configured during the shooting process of the video when the microphone control is in an on state, and not recording of the original sound is configured during the shooting process of the video when the microphone control is in an off state;
  the application comprises: a control configured to provide an access for a user to start shooting the video before the video is shot in real time, a control configured to provide the user with a segmented shot mode of the video before the video is shot in real time, and a control configured to provide the user with a quick shot mode of the video before the video is shot in real time;
  the method further comprising:
  recording the original sound when the video is shot using the audio in a case where it is detected that the microphone control is turned on; and not recording the original sound during the shooting process of the video in a case where it is detected that the microphone control is turned off;
  receiving a configuration instruction for a prop, wherein the prop is configured to affect a display effect of the video in a playback process of the video and does not support recording of the original sound; and
  configuring the prop during the shooting process of the video and displaying the microphone control that is in the off state and does not support changing of a state in the shooting page of the video in response to the configuration instruction for the prop.

2. The method according to claim 1, wherein the microphone control is not displayed in the shooting page of the video in a case where the configuration result indicates that the audio is not configured during the shooting process of the video.

3. The method according to claim 1, wherein when in the case where the microphone control is in the on state, the method further comprises:
receiving a replacement instruction for the audio; and
configuring a replaced audio during the shooting process of the video, and displaying the microphone control in the shooting page of the video in response to the replacement instruction.

4. The method according to claim 1, wherein in the case where the microphone control is in the off state, the method further comprises:
configuring a dithered display of the microphone control in the shooting page of the video.

5. The method according to claim 1, further comprising:
configuring a first prompt content to be displayed in the shooting page of the video within a first preset time period in a case where the microphone control is switched from the off state to the on state, wherein the first prompt content is configured to prompt a user that the video shot using an earphone presents a favorable effect.

6. The method of claim 1, further comprising:
using a microphone sound of an electronic device as the original sound by adopting a low delay echo cancelling technology in a case where a user does not use an earphone to shoot the video; and
using a microphone sound of the earphone as the original sound in a case where the user uses the earphone to shoots the video.

7. The method according to claim 1, further comprising:
receiving an editing instruction for a volume of the video; and
displaying an adjustment control in a volume editing page of the video in response to the editing instruction, wherein the adjustment control is configured to adjust a volume ratio of the audio and the original sound.

8. The method according to claim 1, further comprising:
receiving an editing instruction for a volume of the video; and
displaying a first control and a second control in a volume editing page of the video in response to the editing instruction, wherein the first control is configured to adjust a volume of the audio, and the second control is configured to adjust a volume of the original sound.

9. The method according to claim 1, further comprising:
receiving an adjustment instruction for a volume of the video; and
adjusting a volume of the audio and/or a volume of the original sound in the video in response to the adjustment instruction.

10. The method according to claim 9, wherein the receiving of the adjustment instruction for the volume of the video comprises: receiving the adjustment instruction on the adjustment control.

11. The method according to claim 1, further comprising:
displaying a second prompt content in the shooting page of the video during a second preset time period, wherein the second prompt content is configured to prompt a user that the prop does not support recording of the original sound.

12. The method according to claim 1, wherein in a case where the video is shot in a segmented shot mode, the method further comprises:
receiving an editing instruction on the microphone control after pausing a shoot of a segment of the video; and
displaying the microphone control in the on state in the shooting page of the video in response to the editing instruction, or displaying the microphone control in the off state in the shooting page of the video in response to the editing instruction.

13. The method according to claim 12, wherein after the shooting process of the video in the segmented shot mode is completed, the method further comprises:
receiving an adjustment instruction for a volume of the video; and
adjusting a volume of the audio and/or a volume of the original sound in at least one segment of the video in response to the adjustment instruction.

14. An electronic device, comprising: one or more processors; a memory; and one or more computer programs; wherein the one or more computer programs are stored in the memory, and the electronic device implements the video processing method for the application according to claim 1 when the one or more processors execute the one or more computer programs.

15. A non-transitory computer storage medium, comprising computer instructions, wherein an electronic device implements the video processing method for the application according to claim 1 when the computer instructions run on the electronic device.

* * * * *